US008626186B2

(12) United States Patent
Carmon et al.

(10) Patent No.: US 8,626,186 B2
(45) Date of Patent: Jan. 7, 2014

(54) AVOIDING TRANSMITTER COLLISION SESSIONS IN FEMTOCELLS ARRAYS (75) Inventors: Rafy Carmon, Rishon le Zion (IL); Alan Carter, Swindon Wiltshire (GB); Ami Appel, Kfar Saba (IL); Benny Arviv, Tzur Moshe (IL); Alon Shechter, Hertzeliya (IL); Stephen Whitakker, Berkshire (GB)

(73) Assignee: Percello Ltd., Raanana (IL)

( * ) Notice: Subject to any disclaimer, the term of this patent is extended or adjusted under 35 U.S.C. 154(b) by 59 days.

(21) Appl. No.: 13/057,690

(22) PCT Filed: Aug. 6, 2008

(86) PCT No.: PCT/IL2008/001078
§ 371 (c)(1),
(2), (4) Date: May 24, 2011

(87) PCT Pub. No.: WO2010/016050
PCT Pub. Date: Feb. 11, 2010

(65) Prior Publication Data
US 2011/0230181 A1    Sep. 22, 2011

(51) Int. Cl.
*H04W 24/00*    (2009.01)
*H04W 4/00*     (2009.01)
*H04M 1/00*     (2006.01)

(52) U.S. Cl.
USPC .................... 455/456.1; 455/560; 455/422.1; 370/328

(58) Field of Classification Search
USPC ....................................... 455/561
See application file for complete search history.

(56) References Cited

U.S. PATENT DOCUMENTS

| 7,379,518 | B2 * | 5/2008 | Dick et al. | 375/356 |
| 2002/0098839 | A1 * | 7/2002 | Ogino et al. | 455/424 |
| 2006/0171421 | A1 | 8/2006 | Matsunaga et al. | |
| 2007/0218948 | A1 * | 9/2007 | Kurokawa | 455/560 |
| 2007/0230592 | A1 | 10/2007 | Choi et al. | |

(Continued)

FOREIGN PATENT DOCUMENTS

WO    WO 2010/016050 A1    2/2010

OTHER PUBLICATIONS

International Search Report and Written Opinion directed toward related International Patent Application No. PCT/IL/08/01078, ISA/US, Alexandria, Virginia, United States, mailed Nov. 26, 2008; 9 pages.

*Primary Examiner* — Lester Kincaid
*Assistant Examiner* — Andy Gu
(74) *Attorney, Agent, or Firm* — Sterne, Kessler, Goldstein & Fox P.L.L.C.

(57) ABSTRACT

Control unit within a femtocell base station is arranged to detect a transmission collision situation and resolves it by adjusting the timing of the transmission signal and consequently the frame position gradually over time. The adjustment (or shift) is performed in a slow enough rate such that the User Equipments currently connected (camped) to the femtocell base station remain connected. Additionally, a method is also provided. The method comprises: detecting neighboring base stations; detecting frame boundaries of the transmitting signal of each detected neighboring base station; calculating optimal transmit position; setting transmit position to calculated optimal transmit position; and maintaining optimal transmit position by gradually adjusting transmit position over time. In case, detecting neighboring base stations is not possible, the method comprises: detecting absolute time drifting in view of an absolute accurate time reference and maintaining constant absolute transmit position by gradually adjusting transmit position over time.

20 Claims, 5 Drawing Sheets

(56) References Cited

U.S. PATENT DOCUMENTS

| | | |
|---|---|---|
| 2007/0287501 A1 | 12/2007 | Hoshina et al. |
| 2008/0117915 A1 | 5/2008 | Khirman |
| 2008/0159417 A1 | 7/2008 | Yin et al. |
| 2009/0310532 A1* | 12/2009 | Neil .............................. 370/328 |

* cited by examiner

AVOIDING TRANSMITTER COLLISION SESSIONS IN FEMTOCELLS ARRAYS

TECHNICAL FIELD

The present invention relates to the field of cellular communication systems, and more particularly, to the femtocells base stations operable within cellular communication networks.

BACKGROUND OF THE INVENTION

Prior to setting forth the background of the invention in detail, it may be helpful to set forth definitions of certain terms that will be used hereinafter.

The term "cellular communication network" as used herein in this application, is defined as any radio frequency (RF) based communication network that is based upon geographical partition of space into cells. Each cell is provided with at least one base station that manages the wireless communication therein. Various cellular communication standards are currently in use while other are being developed. The popular ones are: UMTS, HSPA, GSM, CDMA-2000, TD-SCDMA, LTE and WiMAX.

The term "Macrocell" as used herein in this application, also known as Macrocell Base Station (MBS) is defined as a cell in a mobile phone network that provides radio coverage served by a power cellular base station (e.g. tower). The antennas for macrocells are usually mounted on ground-based masts, rooftops and other existing structures, at a height that provides a clear view over the surrounding buildings and terrain. Macrocell base stations have power outputs of typically few watts to tens of watts.

The term "Femtocell" as used herein in this application, also known as Femtocell Base Station (FBS) or Home NodeB is defined as a small cellular communication base station, typically designed for use in residential, enterprise or small business environments. The femtocell connects to the service provider's network via broadband (such as DSL or cable). Current designs typically support 2 to 5 mobile phones simultaneously in a residential setting, and it is possible to increase the number to 16. A femtocell allows service providers to extend service coverage and capacity indoors, especially where access would otherwise be limited or unavailable. The femtocell incorporates the functionality of a typical base station but extends it to allow a simpler, self contained deployment. By way of example, a UMTS femtocell may contain a Node B, RNC and GSN with Ethernet for backhaul.

The term "frame" as used herein in this application is the term used in digital communication systems (e.g., cellular communication networks) to define a fixed block of data transmitted as a single entity. Each frame contains a predefined number of "chips" wherein each "chip" represents a predefined period of time. The length of all frames in a given cellular communication network is equal and is defined by the "frame borders" or "frame boundaries". The position on the timescale in which the frame starts is referred to as "frame position". The "temporal transmit position" is the position on the timescale in which the signal begins. Each frame usually starts with transmit signal for a predefined time which then turns off for the reminder of the frame.

Figure 1:
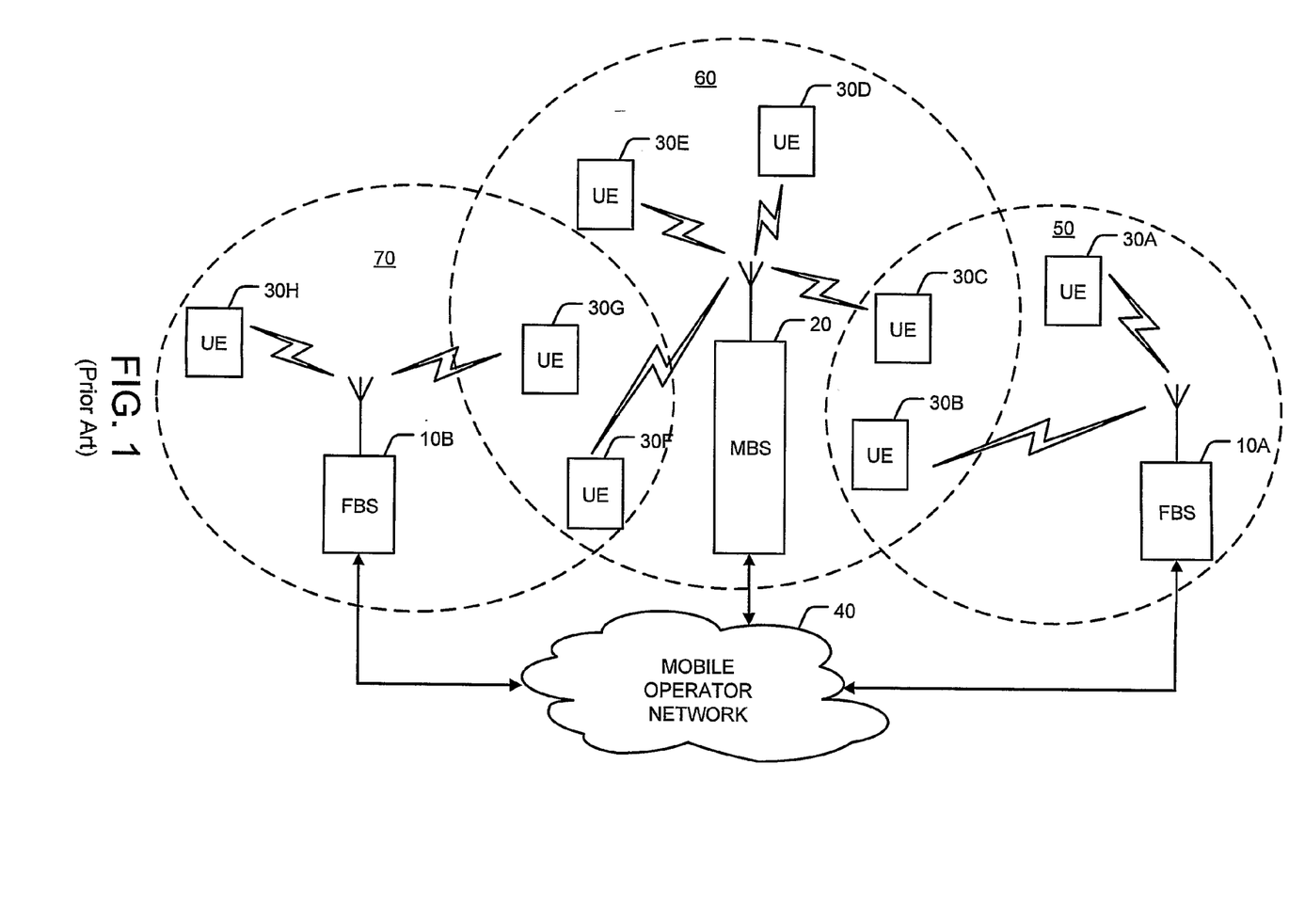
FIG. 1 is a high level schematic block diagram of a cellular communication network according to the prior art.

FIG. 1 shows a schematic high level block diagram illustrating a cellular communication network comprising both macrocell base stations and femtocell base stations according to the prior art. The cellular communication network comprises a mobile operator network 40 coupled to a macrocell base station (MBS) 20 and two femtocell base stations (FBS) 10A and 10B via gateways and cables (not shown).

Each base station 20, 10A and 10B creates a transmission sphere (or cell) around it 50, 60 and 70 respectively that defines the geographical region in which the base station is operative. Each base station 20, 10A and 10B is in communication with devices having wireless connectivity 30A-30H, referred to in this application as "User Equipment" (UE) for the sake of simplicity. User Equipment 30A-30H may comprise by way of example: cellular (mobile) phones, personal device accessories (PDA), laptop computers, handheld computers and the like.

One of the challenges of the evolving femtocell base stations technology is avoiding transmitter collision sessions in neighboring cells array. Transmission collisions occur when a plurality of base stations are transmitting frames with overlapping or too close frame positions. Further, in the case of CDMA or W-CDMA these collisions may be notably severe, if the neighboring cells are using the same scrambling code or the same spreading code. In such a case decoding is not possible at all.

As collisions substantially degrade the quality of service, they need to be avoided completely. In macrocell base station deployment these collisions are avoided by carefully planning frame timing for each stationary macrocell base station in view of the neighboring stations. In some mobile technologies these collisions can further be avoided by assigning different scrambling codes or spreading codes to neighbor cells. Macrocell base stations are arranged such that they must support accurate transmission timing and different scrambling codes or spreading codes.

Figure 2A:
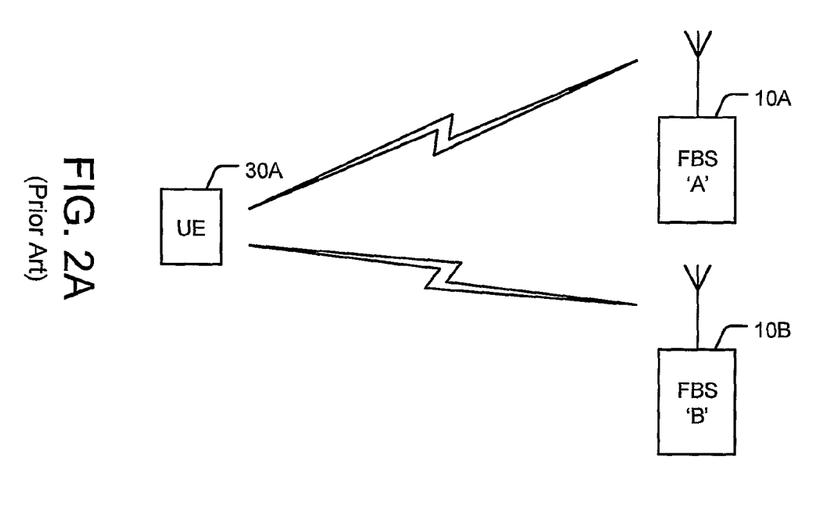
FIG. 2A is a high level schematic block diagram showing two neighboring base stations according to the prior art.
Figure 2B:
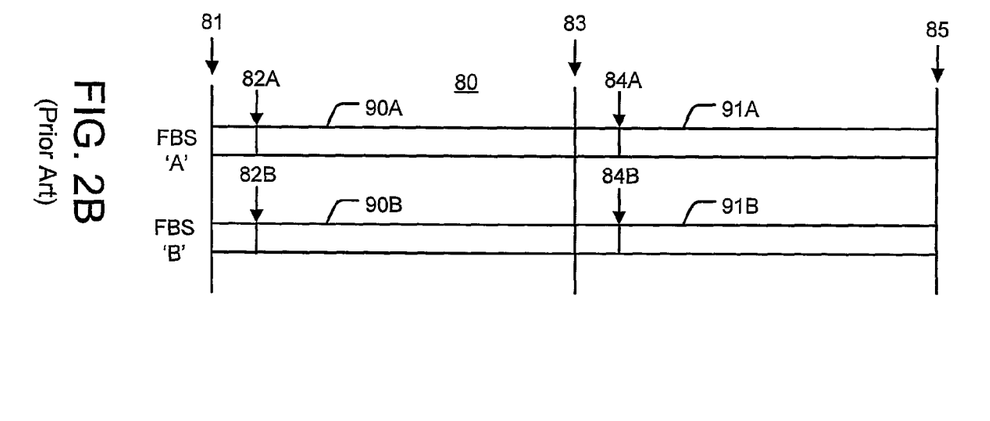
FIG. 2B is a timing diagram of two neighboring base stations according to the prior art.

However, in femtocell base stations technology where each user independently positions a femtocell bases station, careful planning of stations deployment is not possible. By way of example, FIG. 2A shows a schematic block diagram of two neighboring femtocell base stations according to the prior art. Femtocell base stations 10A and 10B are spatially positioned such that their corresponding cells are overlapping over time and scrambling code such that User Equipment 30A is in communication with both base stations 10A and 10B. FIG. 2B shows a timing diagram 80 corresponding to the operation of base stations 10A and 10B according to the prior art. As shown in diagram 80, frame 90A attributed to FMS 10A starts at frame position 81, exhibits valid data chips from 81 to 82A, ends at 83, and proceeds periodically therefrom. Similarly, frame 90B attributed to FMS 10B starts at same frame position 81, also exhibits valid data chips from 81 to 82A, ends at 83 and proceeds periodically therefrom. Clearly, this timing scheme is such that the frames positions of both femtocell base stations 10A and 10B are temporally positioned on the same spot, resulting in transmission session collision. Consequently, in operation, User Equipment 30A will encounter severe difficulties in communicating with either femtocell base stations 10A or 10B. In fact, in the case that femtocell base stations 10A and 10B utilize the same scrambling code, such communication is deteriorated or not possible at all. Clearly, the aforementioned collision scenario may also occur between a femtocell base station and a macrocell base station. Further, due to non-equal or random minor time drifts of neighbor macrocells or femtocells, collisions are expected to happen periodically for significant intervals, wherein in these periods the communication is reduced or not available at all.

It would be therefore advantageous to provide a solution for avoiding transmitter collision sessions in neighboring femtocells array in order to facilitate independent femtocell base stations deployment.

BRIEF SUMMARY

Accordingly, it is a principal object of the present invention to overcome the disadvantages of the prior art. This is provided in the present invention by adding transmitter timing adjust functionality to the femtocell base station.

In embodiments of the present invention, a control unit within the femtocell base station is arranged to detect a transmission collision situation and resolves it by adjusting the timing of the transmission signal and consequently the frame position gradually over time. The adjustment (or shift) is performed in a slow enough rate such that the User Equipments currently connected (camped) to the femtocell base station remain connected.

In embodiments of the present invention there is provided a method of avoiding transmitter collisions sessions in femtocells array. The method comprises: detecting neighboring base stations; detecting frame boundaries of the transmitting signal of each detected neighboring base station; calculating optimal transmit position; setting transmit position to calculated optimal transmit position; and maintaining optimal transmit position by gradually adjusting transmit position over time. In the case that detecting neighboring cells is not possible, the method comprises: detecting femtocell drift in view of an absolute time source and maintaining constant absolute transmit position by gradually adjusting transmit position over time.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

The drawings together with the description make apparent to those skilled in the art how the invention may be embodied in practice.

DETAILED DESCRIPTION OF THE INVENTION

Embodiments of the present invention provide a femtocell base station control unit, a method and a cellular communication network arranged to avoid potential transmitter collision scenarios, which might disable femtocells base stations service. A femtocell base station operable in accordance with the present invention will be able to provide communication services in all deployment scenarios, and to resolve the lack of cell planning that characterizes femtocell arrays even in the case where neighbor cells use the same scrambling code or spreading codes.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 3:
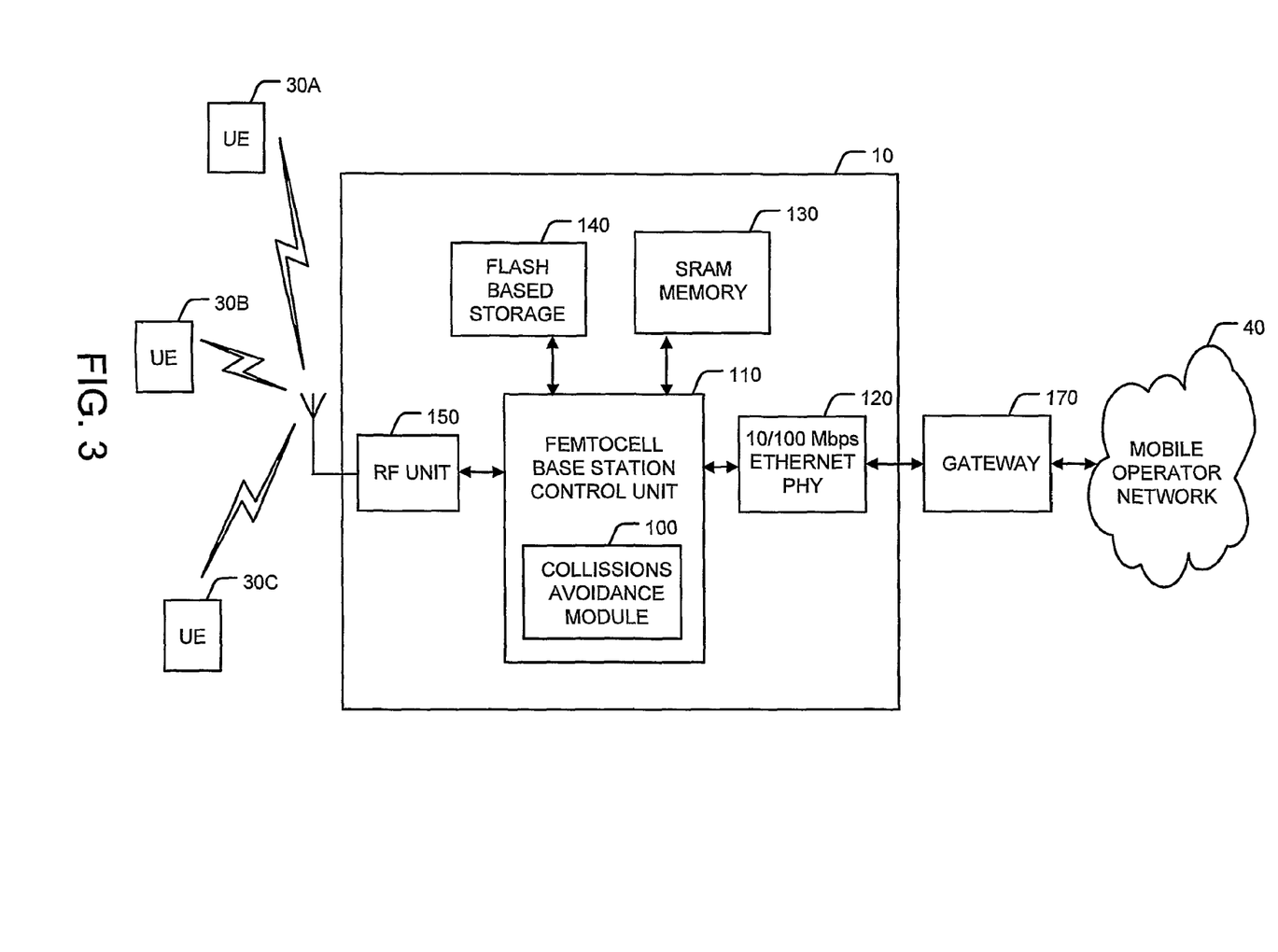
FIG. 3 is a schematic block diagram of a femtocell base station according to some embodiments of the present invention.

FIG. 3 is a schematic block diagram of a femtocell base station according to some embodiments of the present invention. Femtocell base station 10 comprises a femtocell base station control unit 110 that comprises in turn a collisions avoidance module 100. femtocell base station control unit 110 is coupled to and operatively associated with: an RF unit 150; a flash based storage 140; an SRAM memory 130. Femtocell base station control unit 110 is further coupled to and operatively associated with a mobile operator network 40 via a 10/100 Ethernet physical layer module 120 and a gateway 170. Femtocell base station 10 is in communication with user equipment 30A-30C.

In operation, femtocell base station control unit 110 is arranged to manage and control the traffic in the cell associated with femtocell base station 10. The femtocell traditional functionalities are achieved by femtocell base station control unit 110 in cooperation with RF unit 150, flash based storage 140, SRAM memory 130, 10/100 Ethernet physical layer module 120, gateway 170, and mobile operator network 40. In addition, collisions avoidance module 100 is operable to avoid transmit collisions with neighboring base stations.

Specifically, collisions avoidance module 100 attempts detection of neighboring base stations. In the case that neighboring base stations are detected, collisions avoidance module 100 detects frame boundaries of the transmitting signal of each detected neighboring base station and calculates the temporal transmit position such that the likelihood of transmit signals collisions is minimized. In the case that no base stations are detected for a predefined time, collisions avoidance module 100 calculates the temporal transmit position to be the current transit position added to a predefined period of time (e.g., predefined number of chips). In either case, collisions avoidance module 100 then sets the transmit position to calculated temporal transmit position and maintains temporal transmit position by gradually adjusting temporal transmit position over time.

Figure 4:
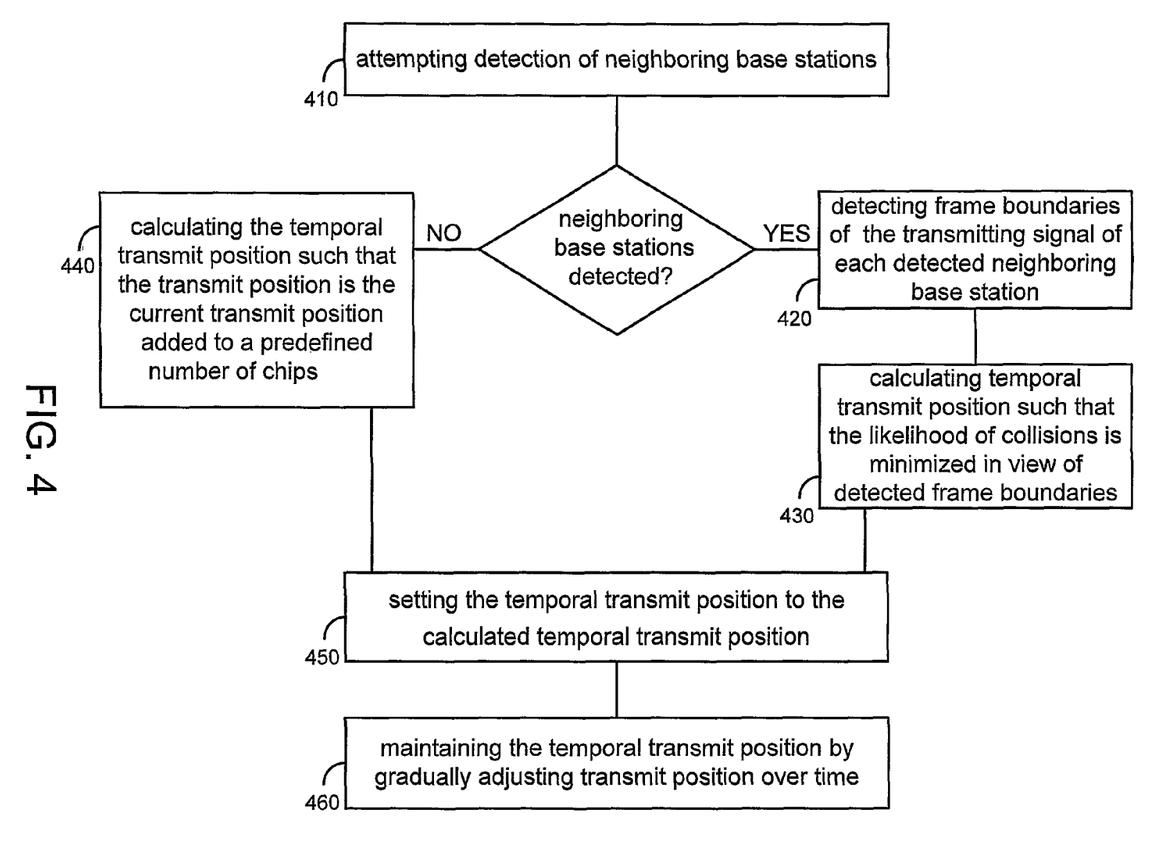
FIG. 4 is a high level flow chart showing a method according to some embodiments of the invention.

FIG. 4 is a high level flow chart showing a method according to some embodiments of the invention. The disclosed method is a method of avoiding collision sessions in neighboring femtocell base station arrays, wherein each femtocell base station is operable to generate a transmission signal exhibiting periodic frames, each frame exhibiting frame boundaries and an active transmit signal within the frame boundaries, the active transmit signal having a temporal transmit position being the start point of the transmit signal the method comprising: attempting detection of neighboring base stations 410; in the case that neighboring base stations are detected: detecting frame boundaries of the transmitting signal of each detected neighboring base station 420; and subsequently calculating temporal transmit position such that the likelihood of transmit signals collisions is minimized in view of detected frame boundaries 430; In the case that no neighboring base stations are detected for a predefined time, calculating the temporal transmit position such that the transmit position is the current transmit position added to a predefined number of chips 440; then, in either case, setting temporal transmit position to calculated temporal transmit position 450; and maintaining temporal transmit position by gradually adjusting transmit position over time 460.

Figure 5:
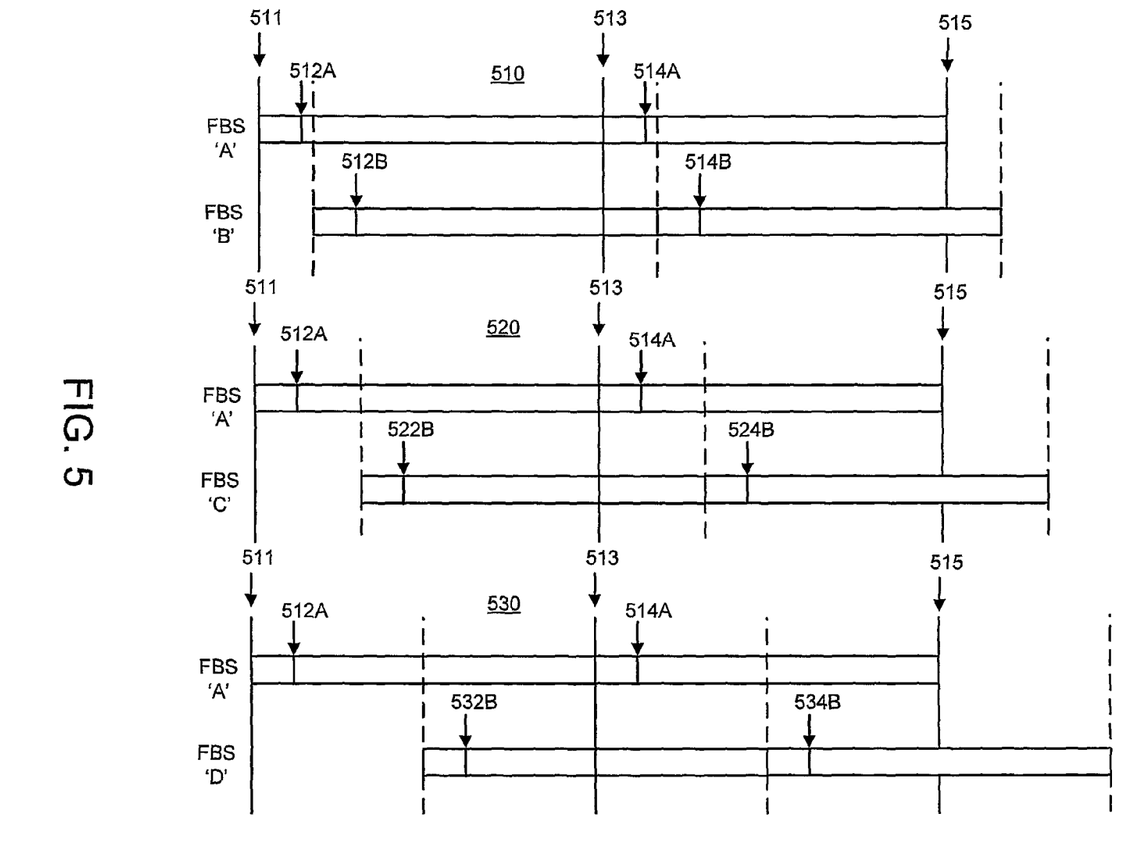
FIG. 5 is a timing diagram of three neighboring base stations according to the present invention.

FIG. 5 shows timing diagrams 510, 520 and 530 of three femtocell base station illustrating the timing positions adjustment performed with regards to femtocell base station "A" according to the present invention. Specifically, after femtocell base station "A" has detected the presence of neighboring femtocell base stations "B", "C" and "D", and their corresponding frame boundaries and timing positions, optimal transmit position 512 is calculated, and set to femtocell base station "A". As shown in diagrams 510, 520 and 530, transmit position for femtocell base station "A" was selected such that no collision may occur with any of femtocell base stations "B", "C" or "D". By way of example only, it may be shown that in relation with femtocell base station "D", the transmit position was selected as the farthest position, while in relation with femtocell base station "B", the transmit position is only shifted a few chips from the transit position of femtocell base station "A". After adjusting the margins set above, embodiments of the present invention maintain and adjust the transmit position accordingly such that collisions are avoided and yet connected (camped) user equipment remains connected to the femtocell base station.

According to some embodiments of the present invention, base stations (macrocells and femtocells alike) and specifically third generation (3G) cells detection may be achieved by adding a third/second generation (3G/2G) cells search module to the femtocell base station. This module is already used in User Equipment.

According to some embodiments of the present invention, base stations detection may be achieved by instructing the connected (camped) user equipment at a given time to measure the time difference between two cells by using, by way of example, CFN-SFN or SFN-SFN measurements reports.

According to some embodiments of the present invention, the temporal transmit position exhibiting the minimal likelihood of collision with neighboring femtocells transmit signals is calculated by setting the femtocell transmit frame position as far as possible from the frame positions of any neighboring macrocell and other femtocells.

According to some embodiments of the present invention, once the new timing position has been updated, the transmit adjustment performs the transmit timing update in a very slow manner. Specifically, the rate of timing correction is chosen such that connected (camped) user equipment on the cell of a given femtocell base station are capable to tack the change whether they are in Idle mode or Connected mode.

According to some embodiments of the present invention, transmit timing adjustment for UMT networks is chosen such that it is slower than 25 chips in 5 seconds. Each elementary step should be less than a predefined number chips.

According to some embodiments of the present invention, maintaining the new transmit timing position of a given femtocell base station and avoiding transmit timing drifts is achieved by a GPS receiver, NTP or PTP or any timing protocols over IP which provides reference in view of an absolute time reference.

According to some embodiments of the present invention, maintaining the new transmit timing position of a given femtocell base station and avoiding transmit timing drifts is achieved by using highly accurate internal reference clock inside the femtocell base station or alternatively by using the macrocell base station timing which are relatively very accurate since they are connected to a central highly accurate clock.

According to some embodiments of the present invention, in the case that neighboring cells timing cannot be detected, either temporarily or permanently, transmit adjust mechanism may be set to an "updated transmit position" which may be derived from the current transmit timing by adding a predefined number of chips. This update is done in case for a predefined period of time no user equipment has connected (camped) on the cells. This would be an indication that the femtocell has a transmit collision problem with other cell. This reduces the probability of transmission collision between the femtocells and the neighbor cells.

Advantageously, the present invention is aimed for the UMTS femtocells market. However, it is understood that the necessary modification may be performed in order to support any kind of cellular communication, in any standard. The functionality of the present invention serves as in cooperation with the femtocell base station control unit within that is arranged to perform all femtocell required activities within a standalone femtocell base station.

According to some embodiments of the invention, the system can be implemented in digital electronic circuitry, or in computer hardware, firmware, software, or in combinations thereof.

The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, digital signal processors (DSPs) but also general purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A femtocell base station, comprising:
   a femtocell base station control unit configured to generate a transmission signal exhibiting a plurality of periodic frames, wherein each frame exhibits frame boundaries and an active transmit signal within the frame boundaries, and wherein the active transmit signal includes a temporal transmit position being a start point of the transmission signal; and
   a collisions avoidance module configured to:
   detect neighboring base stations;
   detect frame boundaries of a signal transmitted by each of the detected neighboring base stations when neighboring base stations are detected;
   select the temporal transmit position such that a likelihood of collisions between transmit signals is minimized when neighboring base stations are detected;
   select the temporal transmit position to be a current transmit position added to a predefined number of chips when no neighboring base station are detected for a predefined period of time;
   set a transmit position to the selected temporal transmit position; and
   gradually adjust the selected temporal transmit position over time such that the likelihood of collisions between transmit signals remains minimized.

2. The femtocell base station according to claim 1, wherein the collisions avoidance module is configured to detect frame boundaries by instructing a connected user equipment to measure a time difference between two cells.

3. The femtocell base station according to claim 1, wherein the selected temporal transmit position is selected such that a distance between the selected temporal transmit position and transmit positions of the neighboring base stations are maximized.

4. The femtocell base station according to claim 1, wherein the collisions avoidance module is configured to minimize the likelihood of collisions between transmit signals by using at least one of: a GPS receiver, NTP, PTP, a timing protocol over IP, an internal reference clock inside a femtocell, or a central clock coupled to a macrocell base station.

5. The femtocell base station according to claim 1, wherein the femtocell base station control unit is further configured to communicate with a mobile operator network, and wherein the mobile operator network is operable within at least one of the following cellular communication standards: UMTS, HSPA, GSM, CDMA-2000, TD-SCDMA, LTE or WiMAX.

6. The femtocell base station of claim 1, wherein gradually adjusting the selected temporal transmit position over time includes adjusting the selected temporal transmit position at a rate such that user equipment connected to the femtocell base station remains connected.

7. The femtocell base station of claim 1, wherein gradually adjusting the selected temporal transmit position over time includes adjusting the selected temporal transmit position at a rate of less than 25 chips in a 5 second time period.

8. A method of avoiding collisions between transmit signals of neighboring femtocell base stations, wherein each femtocell base station is configured to generate a transmission signal exhibiting periodic frames, wherein each frame exhibits frame boundaries and an active transmit signal within the frame boundaries, and wherein the active transmit signal includes a temporal transmit position being a start point of the transmit signal, the method comprising:
   detecting neighboring base stations;
   detecting frame boundaries of the transmit signals of each detected neighboring base station;
   selecting the temporal transmit position such that a likelihood of collisions between transmit signals is minimized in view of the detected frame boundaries when neighboring base stations are detected;
   selecting the temporal transmit position to be a current transmit position added to a predefined number of chips when no neighboring base stations are detected for a predefined period of time;
   setting a temporal transmit position to the selected temporal transmit position; and
   gradually adjusting the selected temporal transmit position over time such the likelihood of collisions between transmit signals remains minimized.

9. The method of claim 8, wherein detecting the frame boundaries is achieved by instructing a connected user equipment to measure a time difference between two cells.

10. The method of claim 8, wherein selecting the temporal transmit position is achieved by selecting the transmit position that maximizes a distance between the transmit position and the transmit positions of the neighboring base stations.

11. The method of claim 8, wherein selecting the temporal transmit position such that the likelihood of collisions between transmit signals is minimized is achieved using at least one of: a GPS receiver, NTP, PTP, a timing protocol over IP, an internal reference clock inside a femtocell, or a central clock coupled to a macrocell base station.

12. The method of claim 8 wherein the method is operable within at least with one of the following communication standards: UMTS, HSPA GSM, CDMA-2000, TD-SCDMA, LTE or WiMAX.

13. The method of claim 8, wherein gradually adjusting the selected temporal transmit position over time includes adjusting the selected temporal transmit position at a rate such that user equipment connected to the femtocel base station remains connected.

14. A cellular communication network, comprising a plurality of macrocell base stations and femtocell base stations, comprising:
   a femtocell base station control unit, incorporated within at least one of the plurality of femtocell base stations, configured to generate a transmission signal exhibiting periodic frames, wherein each frame exhibits frame boundaries and an active transmit signal within the frame boundaries, and wherein the active transmit signal includes a temporal transmit position being a start point of the transmit signal; and
   a collisions avoidance module configured to:
   detect neighboring base stations;
   detect frame boundaries of a signal transmitted by each detected neighboring base station;
   select the temporal transmit position such that a likelihood of collisions between transmit signals is minimized when neighboring base stations are detected;
   select the temporal transmit position to be a current transmit position added to a predefined number of chips when no neighboring base stations are detected for a predefined period of time;
   set a transmit position to the selected temporal transmit position; and
   gradually adjust the selected temporal transmit position over time such that the likelihood of collisions between transmit signals remains minimized.

15. The cellular communication network according to claim 14, wherein the collisions avoidance module is configured to detect frame boundaries by instructing a connected user equipment to measure a time difference between two cells.

16. The cellular communication network according to claim 14, wherein the selected temporal transmit position is selected such that a distance between the selected transmit position and the transmit positions of the neighboring base stations is maximized.

17. The cellular communication network according to claim 14, wherein the collisions avoidance module is configured to minimize the likelihood of collisions between transmit signals by using at least one of: a GPS receiver, NTP or PTP, a timing protocol over IP, an internal reference clock inside a femtocell, or a central clock coupled to a macrocell base station.

18. The cellular communication network according to claim 14, wherein the femtocell base station control unit is further configured to communicate with a mobile operator network, and wherein the mobile operator network is operable within at least one of the following cellular communication standards: UMTS, HSPA, GSM, CDMA-2000, TD-SCDMA, LTE or WiMAX.

19. The cellular communication network according to claim 14, wherein setting the transmit position is performed at a rate such that user equipment currently connected to at least one of the plurality of femtocell base stations remains connected.

20. The cellular communication network of claim 14 wherein gradually adjusting the selected temporal transmit position over time includes adjusting the selected temporal transmit position at a rate such that user equipment connected to the femtocell base station remains connected.

* * * * *